United States Patent
Hawthorne

(10) Patent No.: US 6,371,416 B1
(45) Date of Patent: Apr. 16, 2002

(54) PORTABLE BEACONS

(75) Inventor: Michael J. Hawthorne, Watertown, NY (US)

(73) Assignee: New York Air Brake Corporation, Watertown, NY (US)

(*) Notice: Subject to any disclaimer, the term of this patent is extended or adjusted under 35 U.S.C. 154(b) by 0 days.

(21) Appl. No.: 09/630,601

(22) Filed: Aug. 1, 2000

(51) Int. Cl.⁷ .................................................. B61L 1/00
(52) U.S. Cl. ............................. 246/122 R; 246/182 R; 246/488; 246/3; 246/4; 246/167 R
(58) Field of Search ................... 246/3, 167, 5, 246/122 R, 124, 187 A, 182 R, 488; 342/357.09, 357.1; 701/213, 301, 19; 340/988, 426, 989–996, 905, 901, 904

(56) References Cited

U.S. PATENT DOCUMENTS

| | | | |
|---|---|---|---|
| 4,359,733 A | * 11/1982 | O'Neill | 343/6.5 LC |
| 4,711,418 A | * 12/1987 | Aver, Jr. et al. | 246/5 |
| 4,983,980 A | * 1/1991 | Ando | 342/357 |
| 5,129,605 A | * 7/1992 | Burns et al. | 246/5 |
| 5,332,180 A | 7/1994 | Peterson et al. | |
| 5,364,047 A | * 11/1994 | Petit et al. | 246/122 R |
| 5,389,934 A | * 2/1995 | Kass | 342/357 |
| 5,418,537 A | * 5/1995 | Bird | 342/357 |
| 5,437,422 A | 8/1995 | Newman | |
| 5,450,329 A | * 9/1995 | Tanner | 364/449 |
| 5,452,870 A | * 9/1995 | Heggestad | 246/182 R |
| 5,554,982 A | * 9/1996 | Shirkey et al. | 340/903 |
| 5,579,013 A | * 11/1996 | Hershey et al. | 342/357 |
| 5,729,213 A | * 3/1998 | Ferrari et al | 340/901 |
| 5,823,481 A | * 10/1998 | Gottschlich | 246/28 R |
| 5,902,341 A | * 5/1999 | Wilson | 701/19 |
| 5,969,643 A | * 10/1999 | Curtis | 340/988 |
| 5,986,577 A | * 11/1999 | Bezos | 340/933 |
| 5,987,979 A | * 11/1999 | Bryan | 73/146 |
| 6,002,362 A | * 12/1999 | Gudat | 342/357.03 |
| 6,218,961 B1 | * 4/2001 | Gross et al. | 340/903 |

FOREIGN PATENT DOCUMENTS

EP 0440105 A2 * 8/1991 ........... G01C/21/20

OTHER PUBLICATIONS

Vehicle Positioning—Do you know where your train is?, *Railway Age*, Feb. 1996, pp. 41–42.

* cited by examiner

Primary Examiner—S. Joseph Morano
Assistant Examiner—Frantz F. Jules
(74) Attorney, Agent, or Firm—Barnes & Thornburg

(57) ABSTRACT

A beacon system for determining its position and transmitting its location to trains on the track. The length of the zone and any operational restrictions can also be transmitted. The location of the zone can be displayed on the train. The beacon system uses a global navigational position system for determining its location, and a transmitter for transmitting its location to trains on the track.

16 Claims, 2 Drawing Sheets

PORTABLE BEACONS

BACKGROUND AND SUMMARY OF THE INVENTION

The present generally relates to train control systems and more specifically to the integration of portable beacons into train control systems.

Train control systems in the United States have developed automatic train control systems (ATCS). These have become positive train separation (PTS) for non-vital applications and positive train control (PTC) for vital applications. Europe has developed a European train control system (ETCS). These systems include controls on the locomotives as well as scheduling control from a central location. Train scheduling control have involved identifying train using moving block signaling by itself or in combination with the fixed block signaling. These are for automatic operation of rapid transit vehicles.

The location of the vehicles relative to each other, a station or a track change are determined and communicated to and from the train. Generally, way side transponders are used to communicate with the train. Typical examples are U.S. Pat. Nos. 5,332,100, 5,364,047, and 5,437,422. These systems deal with known obstacles on the track and the spacing of the trains. Additional information of work zones which are temporarily set up are communicated to a central location. This relies on the central location knowing the status and position of the work zone. Temporary work or operating restriction zones are now defined by flags in the ground adjacent the track. The color of the flag signifies specific operating restrictions.

The present invention provides a portable beacon to be placed adjacent a railroad track. The beacon signifies a zone or a rail condition whose presence is to be brought to the train operator's attention. A navigational positioning is provided at the beacon system for determining its location. This may be a global positioning system. The beacon includes a transmitter or transceiver to transmit the location of the beacon to the trains on the track.

The transmitter also transmits operational restrictions for the zone as well as the length of the zone. The operational instructions may be manually entered into the portable beacon or they may be received by the transceiver from a remote source. The beacon transmits its location to the train by intermediate stations which may be, for example, one or more way side stations along the track or satellite stations.

Where the zone is defined by two beacons, each of the beacons may transmit their locations to the trains. Alternatively, each beacon may transmit its position to the other and only one beacon transmits the information of the pair of beacons to the train. The location of the beacons and their zones as well as operational information along the track may be displayed on the train. A visual indication on the beacon can also signify an operational restriction.

The method of alerting an operator of a train of the existence of one or more portable objects or beacons adjacent the track includes the train and object determining their positions on the track and the object transmits its position to the train. The train and objects determine their position using the navigational positioning system, for example, the global positioning system. The object transmits its signals directly to the train or to the train via a transceiver, for example, satellite or way side stations adjacent the track. The location of the object on the track is displayed on the train.

The object also transmits its identity which includes operational restrictions to the train. A determination can also be made if the operational restrictions apply to the train and if they do, display the operational restrictions.

The identity can also include whether the objects define a zone. The zones defined by the identity are then determined and displayed.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
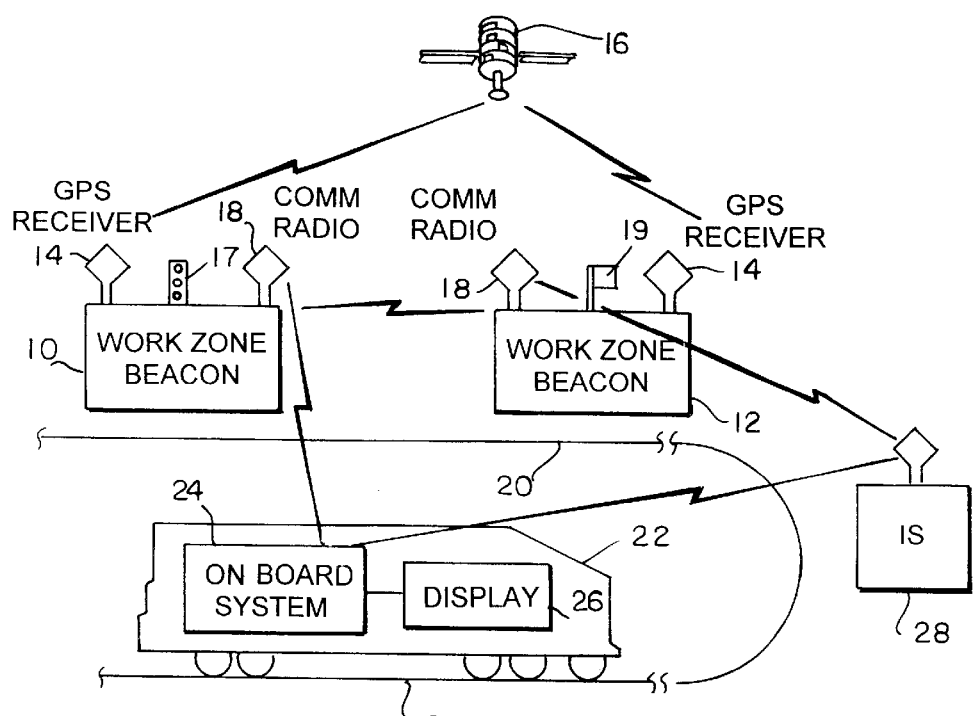
FIG. 1 is a diagrammatic view of a beacon system according to the principles of the present invention.

As illustrated in FIG. 1, a pair of beacons 10 and 12 are positioned along a track 20. Each of the beacons includes a navigational receiver 14 communicating with a satellite 16 to determine its position. This may be a global positioning system. The beacons 10, 12 may define a work zone in which people are working, an area of disruptive track or any other zone which must be brought to the attention of a train approaching that location. If a zone need not be defined, a single beacon 10 or 12 may be used. For example, this may be worn by an individual working on the track or a position adjacent to a track of interest. Also, it may be a position of a single location which requires only temporary notification to the operator of a train approaching the location.

The beacons 10 and 12 also include a radio communication transceiver 18 communicating with an onboard system 24 of a train 22 also on the track 20. Although the beacons 10, 12 are communicating directly with the train 22, they may communicate via intermediate stations 28, for example, additional satellites or by way side stations positioned along the track 20.

Each of the beacons 10, 12 may include a light 17, flashing or strobe, of different colors or a flag 19 to signify specific operating restrictions. This provides visual verification of the displayed operating restrictions as well as notifies trains which do not have a system capable of processing the signals provided from the beacons 10, 12.

Figure 2:
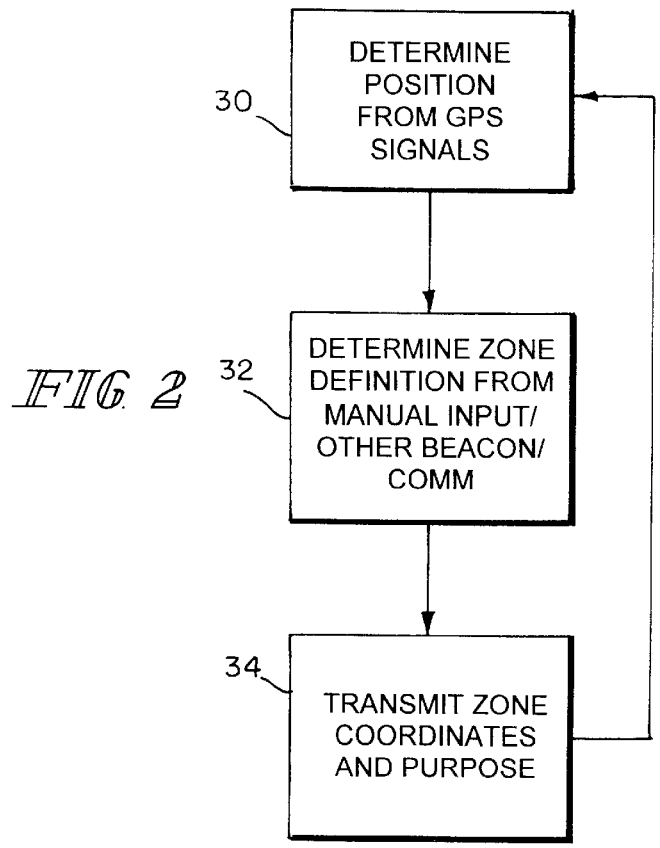
FIG. 2 is a block diagram of the method according to the principles of the present invention.

As illustrated in FIG. 2, each of the beacons 10 and 12 determines at 30 its position from navigational signals. It also determines the zone's definition from manual input, other beacon or other communication channels at 32. The zone definition is the length of the zone and/or any operating restrictions. These operating restrictions include Slow Orders Operating Restrictions Work Crews Train Specific Restrictions Noise Abatement Zones The location's coordinates and the purpose or definition of the zone is then transmitted at 34 to trains 22.

Although a pair of beacons 10 and 12 are shown defining the zone and each transmitting their own signal, one of the work zone beacons 10, for example, may be the only one to determine its position and transmit the information to the trains 22. The position of the other work zone beacon 12 may be determined based on a manual input of the distance between the beacons 10 and 12 or a low level communication can be conducted between the beacons 10 and 12. The two beacons defining a single zone may also include a matching tag so as to be distinguished then as a common zone where zones nest or overlap. The position of the beacons 10 an 12 are displayed on display 26 in the locomotive 22 with respect to the track 20 and the location of the train 22.

Figure 3:
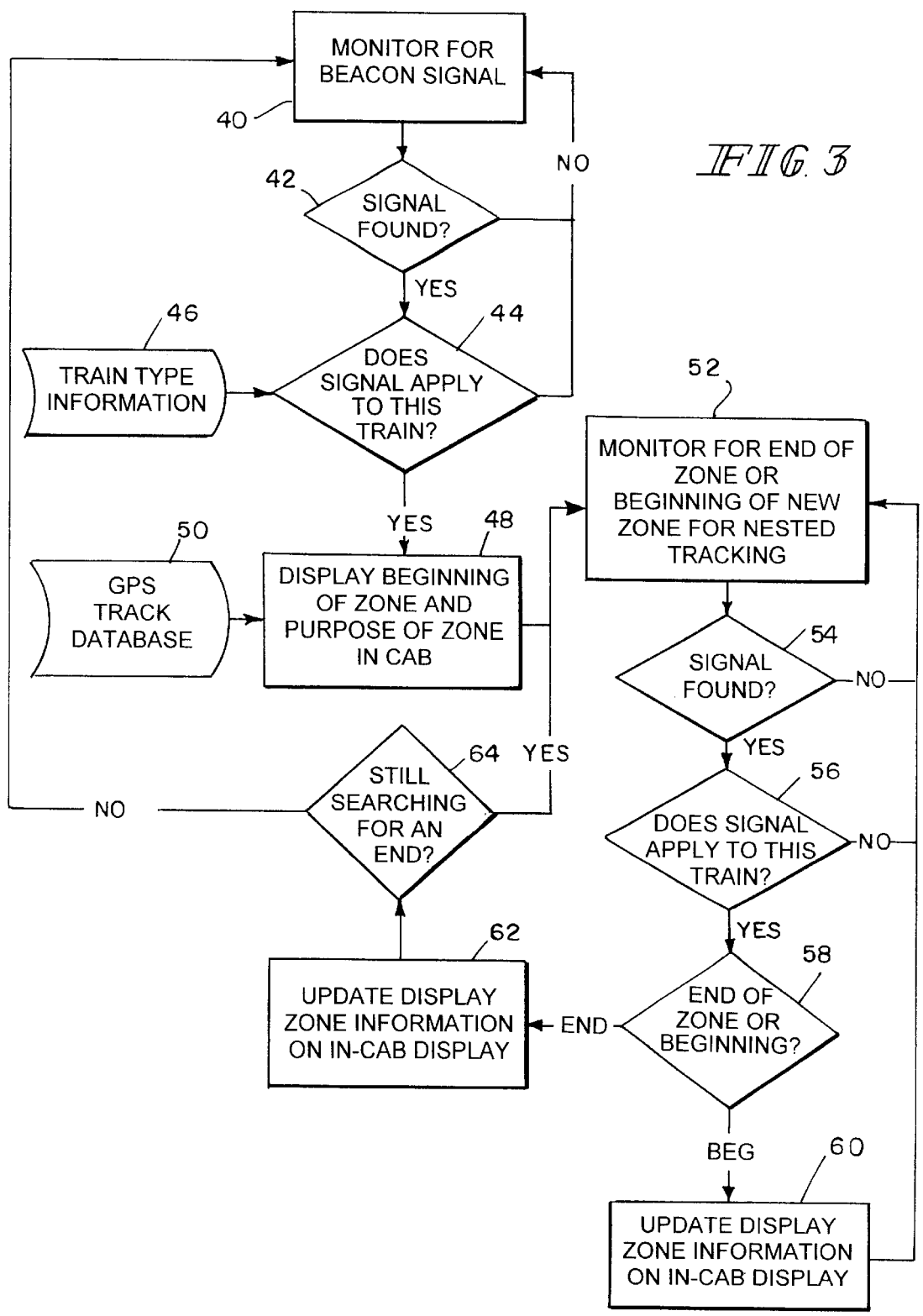
FIG. 3 is a block diagram of the methods performed by the train according to the principles of the present invention.

The on-board system 24 processes the information as illustrated in FIG. 3. It monitors for beacon signals at 40. If a signal is not found at 42, it continues to monitor for signals. If a signal is found, it is next determined whether the received signal applies to this particular train at 44. It uses train type information from memory 46. For example, the restriction may only apply to heavy trains over a certain weight or coal trains without covers on the cars (to present dust). If it does not apply to the train, then it continues to monitor for a beacon signal at 40. If it does apply to this train, it displays the beginning of the zone and the purpose of the zone on display 26 at 48, using the location of the train. The GPS tracking data base 50 determines the location of the train on the display relative to the beacons.

Monitoring for the end of a zone or the beginning of new zone for nested tracking is performed at 52. If a new signal is not found at 52, the monitoring continues. If a new signal is found, it is determined whether the signal applies to the train at 56. If it does not, the monitoring of the end of the zone or the beginning of a new zone at 52 is continued. If it does apply to the train, it is next determined at 58 whether it is the end or beginning of a zone. If it is the beginning of a zone, the display is updated with the zone information on the cab at 60 and the monitoring for the end of the existing zone and the end of the new zone as well as the beginning of a third new zone is continued at 52.

If an end of a zone is determined at 58, the display is updated in the cab with the end of zone at 62. Next, it is determined at 64 whether there are any open zones that it is still searching for. If there are, the monitoring of the end of the existing zone or the beginning of a new zone for nesting is continued at 52. If there are no open zones, the process goes back to monitoring for a beacon signal at 40.

The method of FIG. 3 may be performed on an on-board system 24 as part of an automatic train control system, a positive train separation or positive train control system, or be part of a train engineer's system, for example, the LEADER® System available from New York Air Brake Corporation of Watertown, N.Y. Another system which includes not only determining location but displaying control of a locomotive is described in U.S. patent application Ser. No. 09/151,286 filed Sep. 11, 1998, incorporated herein by reference. With this added information, the engineer of the train can appropriately control the train and take into account a zone defined by the portable beacons 10 and 12. Also, if the engineer is not in charge of the train control or fails to note the zone changes, the automatic control system of the train can take affect.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A method of alerting an operator of a train which travels along a track of the existence of a portable object adjacent the track, the method comprising:

positioning the portable object adjacent the track:

the train and the object determining their positions relative to the track; and the object transmitting its position to the train.

2. A method according to claim 1, wherein the train and the object determine their positions using a global positioning system.

3. A method according to claim 1, wherein the object transmits its position directly to the train.

4. A method according to claim 1, wherein the object transmits its position to the train via a transceiver.

5. A method according to claim 1, wherein the object transmits its position to the train via a satellite.

6. A method according to claim 1, wherein the object transmits its position to the train via a station adjacent the track.

7. A method according to claim 1, including displaying on the train the location of the object on the track.

8. A method according to claim 1, wherein the object is a portable beacon.

9. A method according to claim 1, wherein the object also transmits its identity to the train.

10. A method according to claim 9, wherein the identity includes whether the object defines a zone and including determining the zone defined by the identity and displaying the determined zone.

11. A method of alerting an operator of a train which travels along a track of the existence of a portable object adjacent the track, the method comprising:

positioning a pair of spaced portable beacons adjacent the track;

the train and the beacons determining their positions relative to the track; and the beacons transmitting their position to the train.

12. A method according to claim 11, wherein one of the beacons determines the one beacon's and the other beacon's position and the one beacon transmits the position of both beacons to the train.

13. A method of alerting an operator of a train which travels along a track of the existence of a portable object adjacent the track, the method comprising:

positioning the portable object with operational restrictions adjacent the track;

the train and the object determining their positions relative to the track; and the object transmitting its position and operational restrictions to the train.

14. A method according to claim 13, including determining if the operational restrictions apply to the train and displaying the operational restrictions if they apply to the train.

15. A method according to claim 13, including providing a visual indication on the object signifying the operational restriction.

16. A method according to claim 13, wherein the object defines a zone and includes zone information and including transmitting the zone information to the train, determining the zone defined by the zone information and displaying the determined zone.

* * * * *